United States Patent [19]
Bethell et al.

[11] Patent Number: 4,501,541
[45] Date of Patent: Feb. 26, 1985

[54] MOLD ASSEMBLY FOR MOLDING CUSHION ARTICLES

[75] Inventors: George L. Bethell, Rock Island, Ill.; Donald F. Burch, Coralville; Lysle R. Hinkhouse, Wilton, both of Iowa

[73] Assignee: Sears Manufacturing Co., Davenport, Iowa

[21] Appl. No.: 511,497

[22] Filed: Jul. 7, 1983

Related U.S. Application Data

[63] Continuation-in-part of Ser. No. 418,395, Sep. 15, 1982.

[51] Int. Cl.³ .............................................. B29D 27/04
[52] U.S. Cl. ........................................ 425/117; 249/83; 264/46.6; 264/46.8; 425/127; 425/812; 425/817 R
[58] Field of Search ................... 264/46.8, 46.6; 425/812, 117, 127, 817 R; 249/83

[56] References Cited

U.S. PATENT DOCUMENTS

| 3,737,266 | 6/1973 | Yamamoto | 425/812 X |
| 3,789,094 | 1/1974 | Hutchison | 425/812 X |
| 4,115,170 | 9/1978 | Sanson | 264/46.8 X |
| 4,247,348 | 1/1981 | Lischer | 264/46.8 X |
| 4,264,386 | 4/1981 | Sears, Jr. et al. | 264/46.8 X |
| 4,359,443 | 11/1982 | Michaels | 425/812 X |

Primary Examiner—Philip Anderson
Attorney, Agent, or Firm—Niro, Jager & Scavone

[57] ABSTRACT

A mold assembly for molding a cushion article, such as a seat cushion or the like, for snapping in place onto an appropriate seat support without additional attaching means. The seat cushion has a foam body with a snap-ring member molded integral with a peripheral portion of the body, the snap-ring member providing means for snapping the seat cushion over the seat support. A mold assembly is disclosed for molding the seat cushion, utilizing the snap-ring member as an integral part of the process, and a mold assembly to evacuate entrapped air from the mold cavity.

11 Claims, 5 Drawing Figures

MOLD ASSEMBLY FOR MOLDING CUSHION ARTICLES

RELATED APPLICATIONS

This is a continuation-in-part of our copending application Ser. No. 418,395 which was filed on Sept. 15, 1982.

BACKGROUND OF THE INVENTION

This invention relates generally to a cushion article and a mold assembly and process for molding the article and, more particularly, to a mold assembly for molding a seat cushion or the like which can be snapped in place onto a seat support without additional attaching means.

Traditional methods of making upholstered seat cushions have involved (1) cutting the cover material according to an appropriate pattern; (2) sewing the cut material; and (3) stuffing the cushion. High labor costs result since, in many instances, the cutting and sewing operations are extensive and mostly performed by hand.

To reduce the costs of manufacturing seat cushions, a molding process was devised for manufacturing seat cushions comprising a foam portion having an integral vinyl cover. The vinyl covering first is heated and then drawn into a cold mold by means of a vacuum between the vinyl and the mold. As the vinyl cools, it assumes the contours of the mold. Foam then is poured into the mold to form the foam portion of the seat cushion. This process significantly reduces manufacturing costs and results in a superior seat.

However, cloth has many advantages over vinyl. Specifically, cloth is water vapor permeable. Perspiration that normally collects behind a person sitting in a vinyl seat can pass through cloth and be evaporated so that cloth feels cooler during warm weather and warmer during cold weather. Furthermore, the feel of the cloth is much more luxurious and elegant.

A novel molding process then was devised for manufacturing seat cushions comprising a foam portion having an integral cover including a outer cloth layer. Such a process is disclosed in U.S. Pat. Nos. 4,247,348 and 4,264,386, both of which are assigned to the assignee of the present invention. In that process(s) it was found particularly advantageous to set the stitch of the fabric layer in the mold. This is accomplished by employing a mold heated to at least the fabric set temperature when the cloth is drawn into the mold. The mold then is allowed to cool with the fabric conforming to the shape thereof. By this process the fabric stitch is set to the precise contours of the mold. Foam then is poured into the mold after the cooling step to form an integral seat cushion with a fabric cover.

All of the above innovations in the art have resulted in labor savings because the cloth is processed and shaped much more quickly than in the traditional cutting and sewing process. Shapes commonly found in tufted furniture require yards of sewing, and the assembly of tufts also requires extensive labor.

Yet, one of the major labor intensive problems in fabricating upholstered furniture has not been met, and that problem concerns the assembly of the upholstered seat cushions to a seat support, commonly called a "pan". Traditional methods of assembling upholstered seat cushions to a seat support have included gluing, stapling, metal edging and various intricate techniques which employ extraneous or additional attaching means such as molded stripping or rings which hold the upholstered cushion to a seat support. All these traditional methods or techniques are expensive, complex, labor intensive and often preclude recycling or ready replacement of the upholstered seat cushion.

The present invention is directed to solving the above-identified problem by providing a new and improved mold assembly for molding a seat cushion or the like which has an integral support member for readily attaching the cushion to a seat support or pan.

SUMMARY OF THE INVENTION

An object, therefore, of the present invention is to provide a mold assembly for molding a seat cushion or the like which can be snapped in place onto a seat support without additional attaching means.

In the exemplary embodiment of the invention, a molded seat cushion or the like includes a foam body which is molded in the shape of a desired seat cushion with a peripheral portion complementary to the periphery of the seat support. A snap-ring member is molded integrally with the seat cushion in the area of the peripheral portion thereof and sized relative to the seat support to snap the seat cushion over the seat support without additional attaching means. Thus, all extraneous assembly or manufacturing steps, such as gluing, stapling, edging, etc. for assembling the seat cushion to a seat support are obviated by the present invention.

More particularly, the snap-ring member may comprise a solid support member, but in the preferred embodiment the snap-ring member comprises a hollow tube which may be fabricated of relatively rigid metal or plastic material. The tube not only provides a support member within the seat cushion for snapping the cushion in place onto a seat support, but, as described below, the tube includes vent means for the evacuation of air from the mold during molding of the seat cushion.

In particular, in order to mold a foam seat cushion for snapping onto a seat support, the cushion normally will include a lip in which the support member or tube is disposed. An air pocket is created within the portion of the mold which forms the lip. This causes a problem in evacuating the entrapped air. However, by forming the snap-ring member in tubular form, the snap-ring itself can be utilized as part of the mold assembly for evacuation of the entrapped air from within the mold.

The mold assembly facilitates a process which includes the steps of providing a mold having the shape of a desired seat cushion with a peripheral portion complementary to the periphery of the seat support. A snap-ring member is located in the mold in the area of the peripheral portion of the seat cushion, the snap-ring member not only providing means for snapping the seat cushion over the seat support, but the snap-ring member has vent means for the evacuation of air from the mold. Foam then is poured into the mold and cured to form the seat cushion. The foam adheres to the snap-ring member to hold the member in proper located position as an integral part of the seat cushion on removal of the cured seat cushion from the mold. At least part of the air from within the mold is evacuated through the vent means in the snap-ring member during curing of the foam. Preferably, the snap-ring member comprises a hollow tube, as described above, with a plurality of vent holes therealong for evacuating the air.

The invention contemplates a mold assembly for molding a seat cushion as described above, the mold assembly including conduit means establishing communication between the hollow tubular snap-ring member and the exterior of the mold for evacuating the entrapped air during a molding operation. The conduit means can be used without the snap-ring member for evacuating entrapped air from the interior of the mold assembly during a molding operation.

The invention herein is readily applicable to molding seat cushions which include cloth covers whereby the cloth cover is drawn into the mold prior to pouring the foam into the mold. The cloth cover is thermally set to fix the shape of the cloth and maintain the mold contours prior to pouring the foam into the mold. However, both cloth and vinyl covers can be utilized with the present invention. Simple cold forming of the covers would also be applicable.

Although the present invention is described herein in connection with molding a seat cushion or the like, it is to be understood that the invention is readily applicable for molding a wide variety of cushion articles. For instance, the present invention may be employed to mold such articles as padding for headboards, baby carriages, bar fronts, church kneelers, vehicular padding, handrail padding, paneling and wall coverings, and practically any conceivable application where a cushion article can be snapped in place and yet obviate additional attaching means in accordance with the present invention and particularly where the problem of air entrapment within the mold is prevalent.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
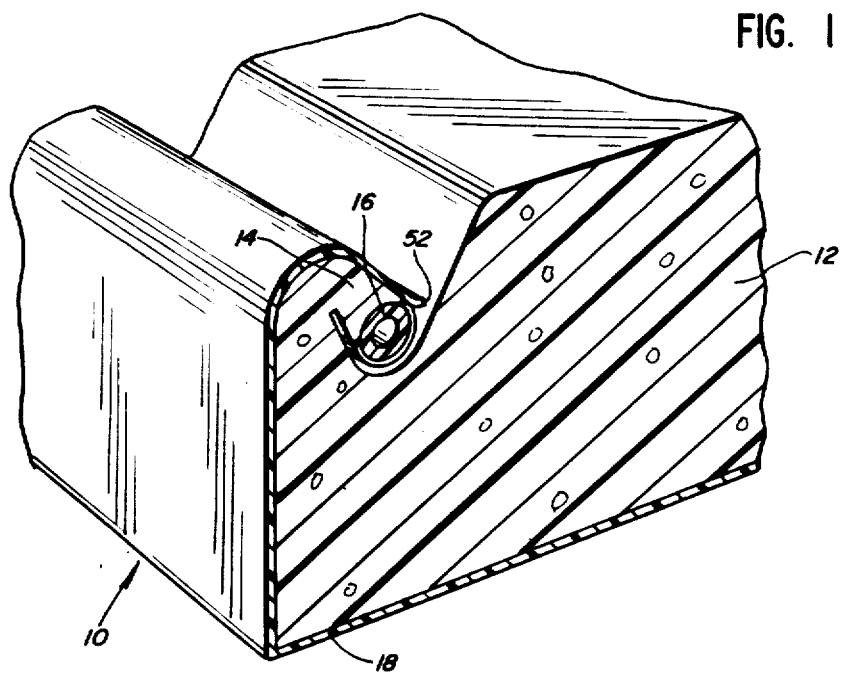
FIG. 1 is a fragmented sectional view through a molded seat cushion incorporating a tubular snap-ring member in accordance with the present invention.

Referring to the drawings in greater detail, and first to FIG. 1, the present invention is directed to molding a cushion article, such as a seat cushion, generally designaged 10, which can be snapped in place onto a seat support without additional attaching means. The seat cushion includes a foam body 12 molded in the shape of a desired seat cushion with a peripheral portion 14 complementary to the periphery of a seat support. The seat support commonly is termed a "pan" and can comprise a wide variety of substructures such as plywood panels, metal sheets, molded support frames, or the like. A support member in the form of a snap-ring member 16 is molded integrally with the seat cushion, particularly foam body 12, in the area of peripheral portion 14 thereof. Of course, the peripheral portion and snap-ring member are sized relative to the periphery of a particular seat support to permit the snap-ring portion of the seat cushion to be snapped over the seat support without any additional attaching means whatsoever. For purposes described in greater detail hereinafter in relation to the process of the present invention, snap-ring member 16 comprises a hollow tube. The tube preferably is fabricated of relatively stiff or rigid plastic or metal material to be capable of performing its assembly function of snapping the seat cushion onto an appropriate seat support.

Seat cushion 10 also may include a vinyl or cloth cover 18 applied to foam body 12. The present invention, particularly the mold assembly, is readily applicable for molding a cloth cover integrally with foam body 12. One method of accomplishing this is by drawing the cloth cover into the mold prior to pouring the foam into the mold. The cloth cover is thermally set to fix the shape of the cloth and maintain the mold contours prior to pouring the foam into the mold. Details of such a process are disclosed in the aforesaid U.S. Pat. Nos. 4,247,348 and 4,264,386.

Figure 2:
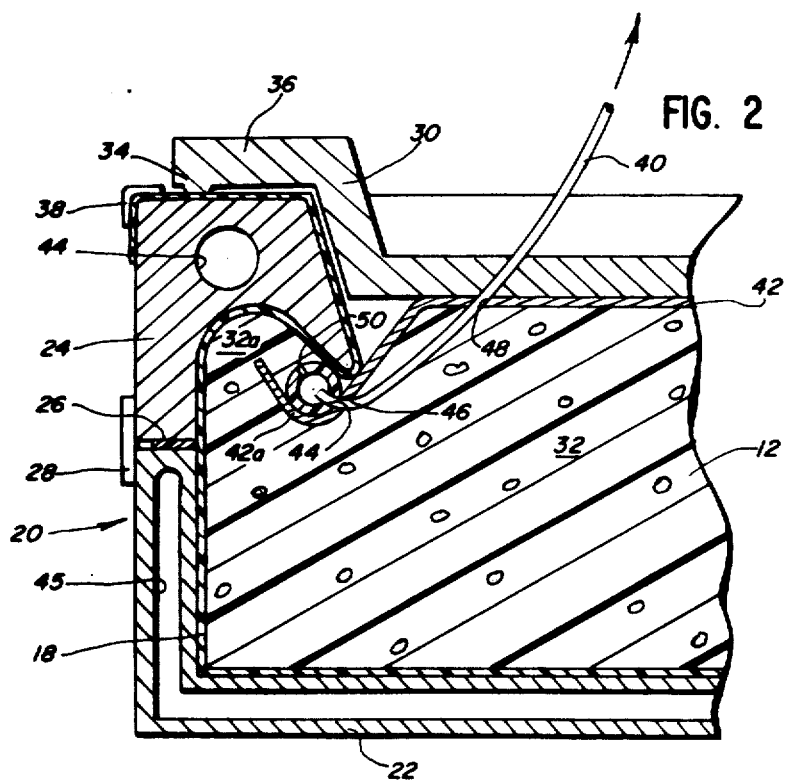
FIG. 2 is a fragmented sectional view through a portion of a mold assembly for molding the seat cushion of FIG. 1.

Referring to FIG. 2, a mold assembly is illustrated for molding a cushion article, such as seat cushion 10, with an integral support member, such as snap-ring member 16. More particularly, the mold assembly includes a main core, generally designated 20, which includes a lower bowl portion 22 and an upper return ring 24. A sealing gasket 26 is disposed about the mold between bowl 20 and return ring 24. A plurality of brace plates 28 are secured to upper return ring 24 and overlie lower bowl portion 22 to maintain the upper return ring horizontally positioned relative to the lower bowl. A main core lid 30 is positionable on top of main mold core 20 to define an interior mold cavity 32. A seal rib 34 depends from an outer peripheral flange 36 of lid 30. An angled seal ring 38 is disposed about the upper portion of return ring 24.

As described in greater detail hereinafter, the mold assembly also includes an air evacuation conduit or tube 40 and an upper mold insert assembly 42.

The process of molding the seat cushion now will be described in relation to seat cushion 10 illustrated in FIG. 1 and the mold assembly illustrated and described in relation to FIG. 2. More particularly, cover 18 for the seat cushion first is formed. This can be done in a separate mold where the cover can include a cloth layer which is thermally set to fix the shape of the cloth and maintain the mold contours of the finished cushion. On the other hand, the mold assembly of the present invention may be employed to fix the shape of the cloth cover. To this end, one or more vacuum chambers 44 are disposed in upper return ring portion 24 and a larger vacuum chamber 45 is disposed in lower bowl portion 22 of the main mold core. These vacuum chambers communicate with pinholes (not shown) in the interior of the mold to draw cover 18 into the mold, to fix the shape of the cover and maintain the mold contours. However, obviously once the cover is drawn into the mold, the vacuum is blocked by the cover and cannot be used to evacuate the mold during a molding operation.

Upper mold insert assembly 42 then is positioned within the mold. The insert assembly is collapsible for this purpose and may comprise a plurality of sections. It is important to note that insert assembly 42 is shaped to conform to the particular seat support or "pan" to which seat cushion 10 is to be assembled. For instance, the particular insert assembly 42 shown in FIG. 2 includes a trough portion 42a disposed about the periphery thereof. At least those portions of insert assembly 42, 42a which are exposed within mold cavity 32 are coated with means providing release surfaces for the cured foam which forms foam body 12 of the seat cushion.

Snap-ring member 16 then is disposed within trough portion 42a of insert assembly 42. Air evacuation conduit or tube 40 then is positioned in communication with the snap-ring member and extends outwardly to the exterior of the mold through an aperture 44 in the snap-ring member and apertures 46, 48 in the insert assembly.

Main core lid 30 then is positioned and locked down onto return ring 24, and insert assembly 42 is pulled up and locked against the lid. It can be seen that air evacuation conduit 40 extends through lid 30 to the exterior of the mold. For purposes described hereinafter, a vacuum may be applied to the conduit to evacuate air from within the closed mold.

With the above-described mold assembly, foam is poured into the mold and cured to form seat cushion body 12. Of course, an appropriate aperture (not shown) would be provided, such as in the lid, for pouring the foam into the mold. The foam adheres to snap ring member 16 to hold the snap-ring member in proper located position of the finished cushion and as an integral part of the seat cushion on removal of the cured cushion from the mold. As stated, this permits the seat cushion to be snapped in place onto a seat support configured complementary to insert assembly 42 without additional attaching means.

The foam is poured into the mold in its liquid state. In the preferred embodiment, any foam that adheres to cover 18 and snap-ring 16 may be used.

As stated above, one of the problems in forming a cushion article, such as seat cushion 10, is the creation of "blind" air pockets within the mold, such as pocket 32a (FIG. 2) which forms the peripheral portion 14 of the seat cushion which snaps under an appropriate seat support. To this end, snap-ring 16 is provided in tubular form and has vent means in the form of a plurality of vent holes 50 spaced along the tubular snap-ring. These vent holes communicate with the interior of the tube and with air evacuation conduit 40. Thus, as the foam expands within mold cavity 32 and into air pocket 32a, entrapping air within the pocket, the air can be evacuated by applying vacuum to evacuation conduit 40 from exteriorly of the mold. The foam then can expand into pocket 32a and fully adhere to the cover which lines the pocket as well as to the exposed portions of snap-ring member 16. The foam, cover and snap-ring member thus become an integral unit on curing of the foam.

After curing, air evacuation conduit 40, main core lid 30, return ring 24, and upper mold insert assembly 42 are removed to permit ready removal of the finished, cured seat cushion 10 with its integral cover 18 and snap-ring member 16. Like insert assembly 42, air evacuation conduit 40 is provided with a release surface for ready removal from the cured foam.

The only remaining step in providing a completely finished seat cushion is to trim the loose cover material from the cushion, as at 52 in FIG. 1. Alternatively, the cover may be trimmed to leave a strip of material which can be tucked under ring 16 in the finished product.

Figure 3:
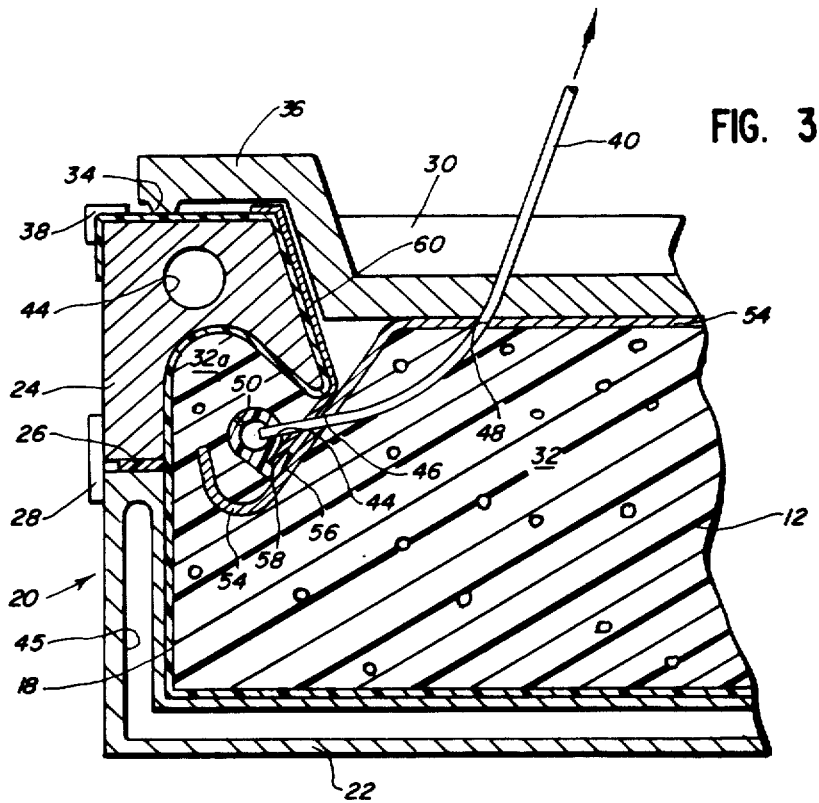
FIG. 3 is a view similar to that of FIG. 2, illustrating an alternate mold assembly particularly including means for holding the snap-ring member properly located within the mold.

FIG. 3 shows an alternate form of mold assembly wherein means is provided for properly locating snap-ring member 16 within the mold assembly during a molding operation. In particular, the upper mold insert assembly 42 shown in FIG. 2 has a trough portion 42a which provides a ready means for locating the snap-ring member relative to the peripheral portion 14 (FIG. 1) of the finished seat cushion. In FIG. 3, an upper mold insert assembly 54 is of a slightly different shape about the periphery thereof. In certain instances, depending upon the particular shape of a seat support to which the seat cushion is to be assembled, it may be desirous to locate snap-ring member 16 spaced inwardly from the insert assembly (i.e. seat support) as well as the surrounding walls of the mold cavity. To this end, snap-ring member is provided with a lip 56 which defines a groove 58 for receiving the distal end of a holding ring 60. The holding ring is sandwiched between return ring 24 and lid 30 of the mold assembly. Of course, at least those portions of holding ring 60 which are exposed within the mold cavity for contact with the poured foam are coated with release material to permit ready removal of the holding ring. Other means are contemplated for properly locating snap-ring member 16 within the mold cavity. For instance, a plurality of screws (not shown) may extend into the cavity and into engagement with the snap-ring member to properly locate the member. It also is contemplated that the snap-ring member may be fabricated of metallic material and magnets may be employed on or in the mold assembly for properly locating the snap-ring member.

Other than holding ring 60 and the modified upper mold insert assembly 54, the remaining mold assembly components illustrated in FIG. 3 are similar to the mold assembly illustrated in FIG. 2 and like numerals are applied where applicable.

Figure 4:
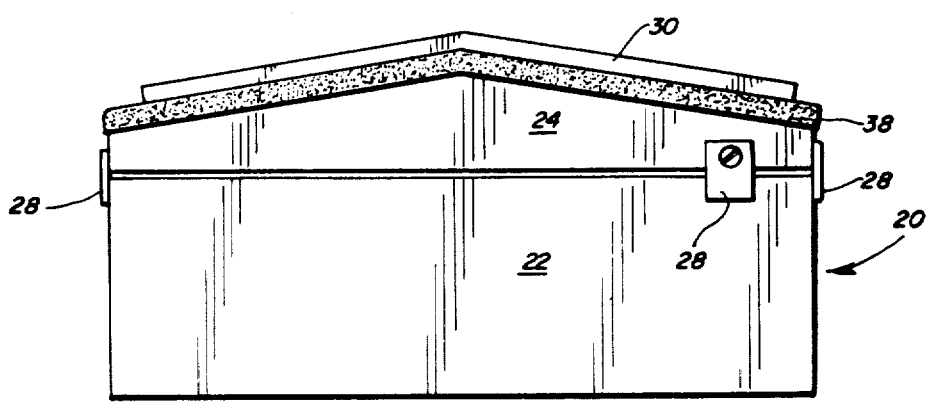
FIG. 4 is an elevational view of the outside of a complete mold assembly applicable to the process of the present invention.

FIG. 4 illustrates an elevational view of the mold assembly in closed condition, with return ring portion 24 disposed on top of bowl portion 22, and with main core lid 30 properly positioned on return ring 24, with seal ring 38 in position. These components can be locked down by various means, such as C-clamps, toggle clamps, or other appropriate means (not shown).

Figure 5:
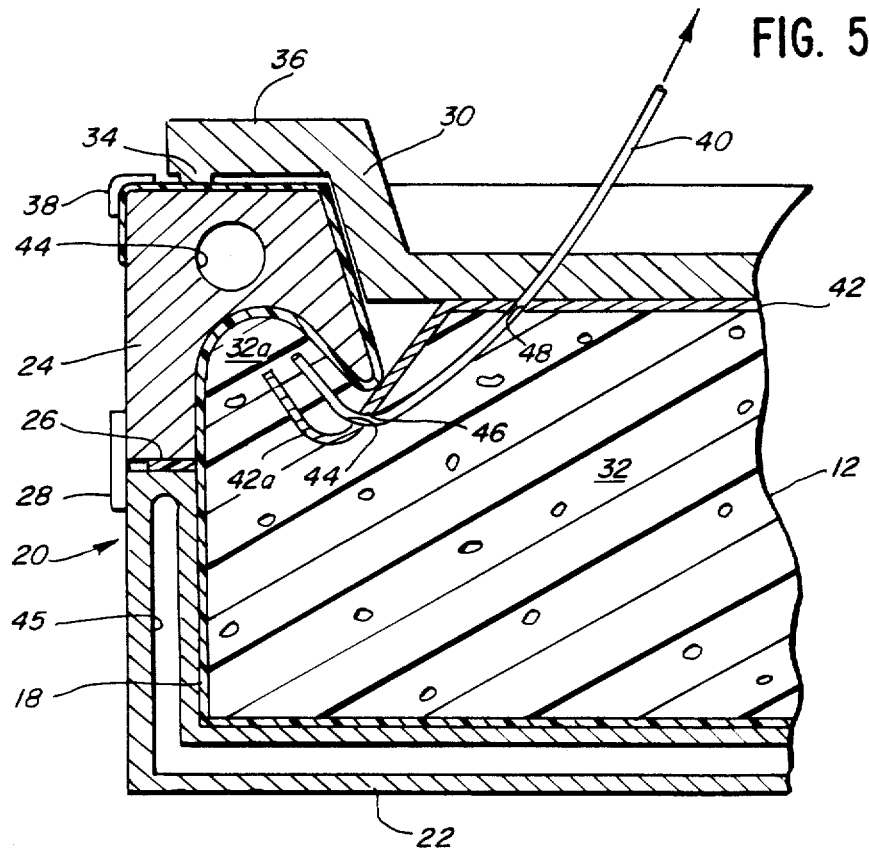
FIG. 5 is a view similar to that of FIG. 2 wherein the conduit means is the sole means for evacuating entrapped air from within the mold.

FIG. 5 illustrates a mold assembly similar to that of FIG. 2 but to mold a covered cushion article not employing a support member or snap-ring. Here again, once cover 18 (whether vinyl or vinyl-backed cloth) is vacuum drawn into the mold, the cover blocks or cuts-off the vacuum from the interior of the mold and the problem of air entrapment in pocket 32a can occur during the molding operation. Therefore, air evacuation conduit 40 or other similar means is employed to evacuate the entrapped air as the foam expands during the curing process. A plurality of such air evacuation means may be employed about the periphery of the mold to insure complete air evacuation. Thus, it can be seen that a novel means has been provided to evacuate the air from a point remote or exteriorly of the mold.

From the foregoing, it can be seen that a new and improved cushion article, such as a seat cushion or the like, can be molded for snapping in place onto an appropriate seat support without additional attaching means. A support member in the form of a snap-ring member is molded integrally with the seat cushion in the peripheral area thereof for snapping the seat cushion over the seat support. However, the invention contemplates the general concept of molding an integral support member or component as a unitary part of the cushion article, and particularly a mold assembly for doing so. A mold assembly is disclosed for molding the seat cushion, with the snap-ring member not only forming an integral supporting part of the finished seat cushion, but the snap-ring member forming an important part of the molding operation for evacuating air which is entrapped within isolated pocket areas of the mold cavity. The invention contemplates novel means for evacuating entrapped air from a mold by means communicating exteriorly of the mold assembly.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A mold assembly for molding a cushion article with an integral support member, comprising:
    a mold having the shape of the desired cushion article and being adapted to position a support member in said mold, the support member having means for venting air entrapped within the mold, the support member intended to be an integral part of the molded cushion article; and
    conduit means establishing communication between said support member and vent means and the exterior of said mold for evacuating the entrapped air during a molding operation.

2. The mold assembly of claim 1 wherein said support member comprises a hollow tube.

3. The mold assembly of claim 2 wherein said hollow tube is fabricated of relatively rigid plastic material.

4. The mold assembly of claim 2 wherein said vent means includes a plurality of vent holes along said hollow tube.

5. A mold assembly for molding a seat cushion or the like which can be snapped in place onto a seat support without additional attaching means, comprising:
    a mold having the shape of a desired seat cushion with a peripheral portion complementary to the periphery of the seat support, said mold being adapted to position a snap-ring member in said mold in the area of the peripheral portion of the seat cushion, the snap-ring member having means for venting air entrapped within the mold whereby the snap-ring member initially is part of the mold assembly but becomes an integral part of the seat cushion providing means for snapping the seat cushion over the seat support.

6. The mold assembly of claim 5, including conduit means establishing communication between said snap-ring member and the exterior of the mold for evacuating the entrapped air during a molding operation.

7. The mold assembly of claim 5 wherein said snap-ring member comprises a hollow tube.

8. The mold assembly of claim 7 wherein said hollow tube is fabricated of relatively rigid plastic material.

9. The mold assembly of claim 7 wherein said vent means includes a plurality of vent holes along said hollow tube.

10. The mold assembly of claim 5 wherein said mold has means defining an interior mold cavity having the shape of the seat cushion, with a peripheral portion of the cavity complementary to the periphery of the seat support not being exposed to the periphery of the mold cavity and capable of entrapping air, said snap-ring member being disposed at least in part in said peripheral portion of the mold cavity.

11. The mold assembly of claim 10, including conduit means establishing communication between said snap-ring member and vent means and the exterior of the mold for evacuating the entrapped air during a molding operation.

* * * * *